INVENTORS
DAVID V. PAULSON
LUBOMYR KURYLKO
LOUIS ZERNOW
BY
ATTORNEY

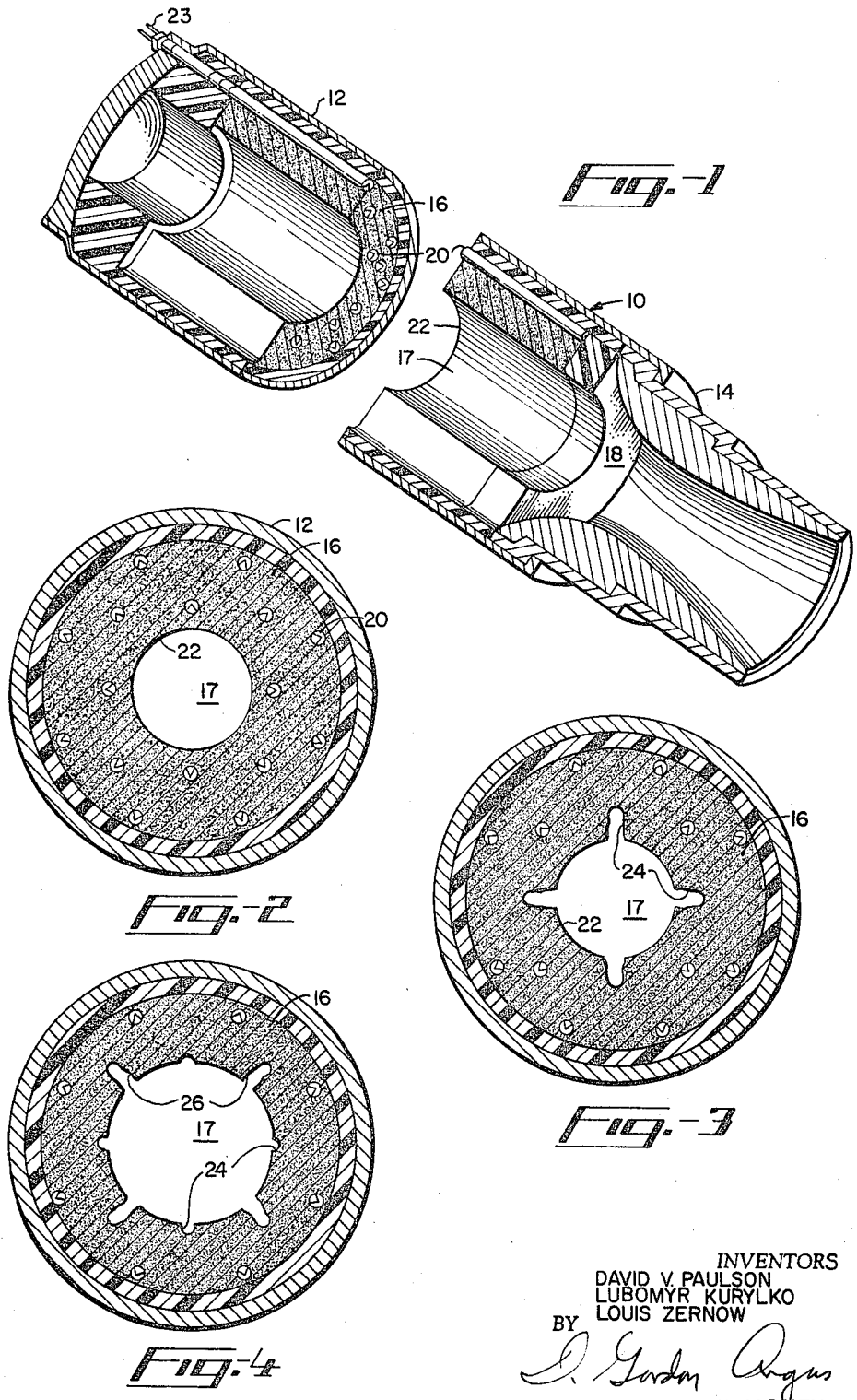

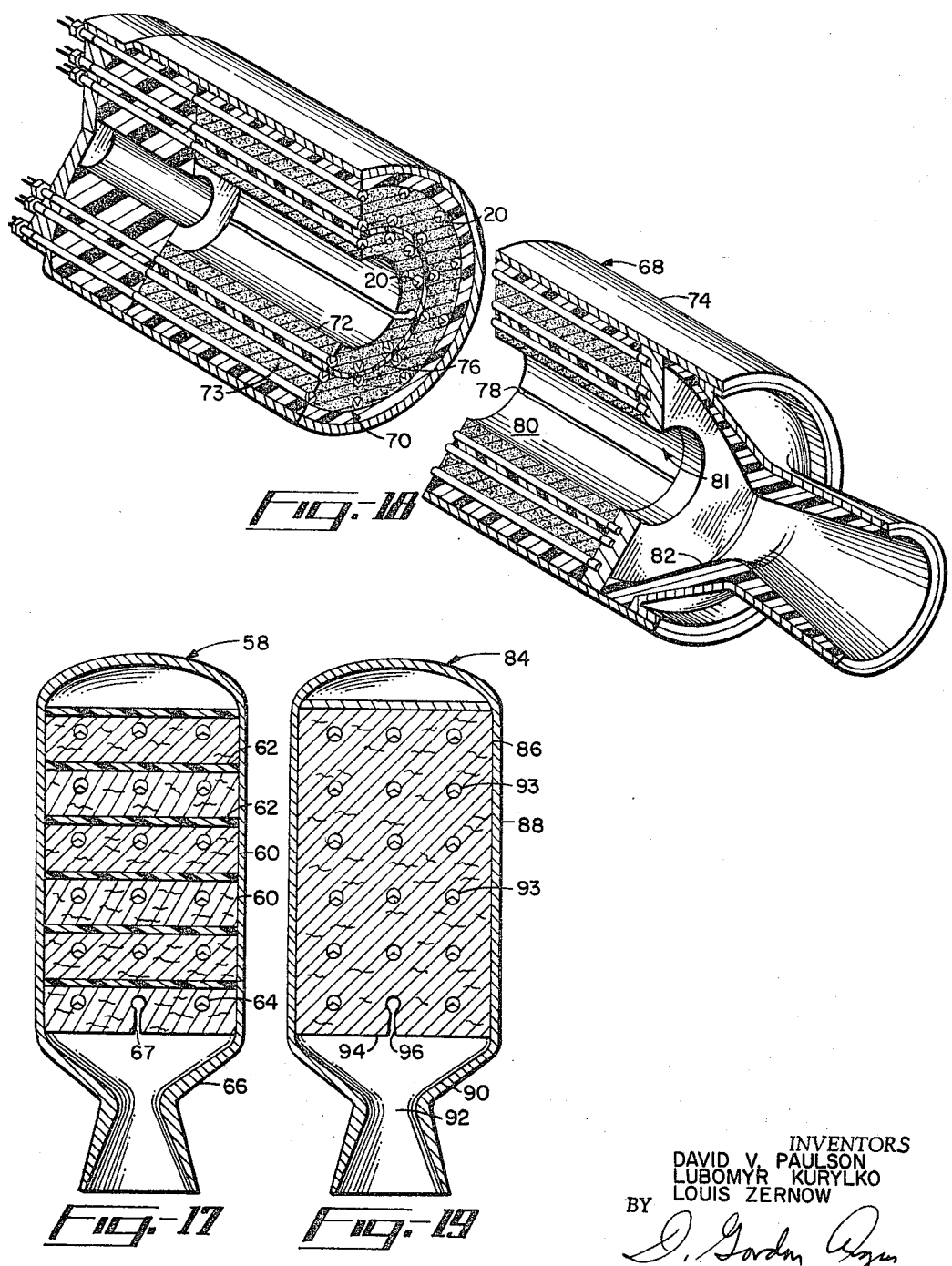

INVENTORS
DAVID V. PAULSON
LUBOMYR KURYLKO
LOUIS ZERNOW
BY
ATTORNEY

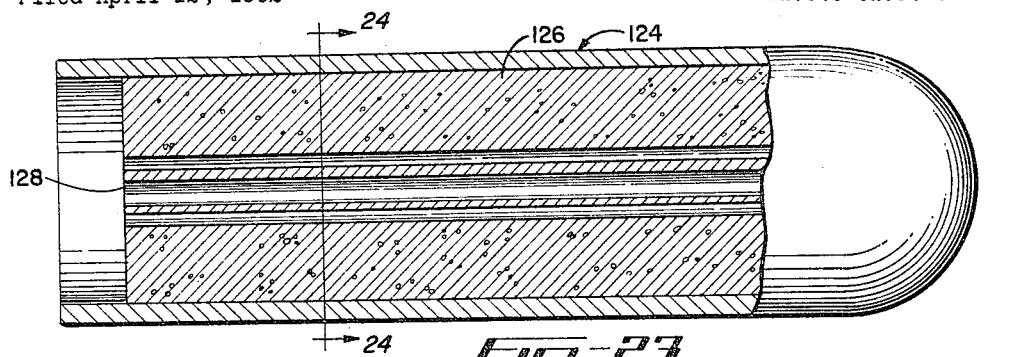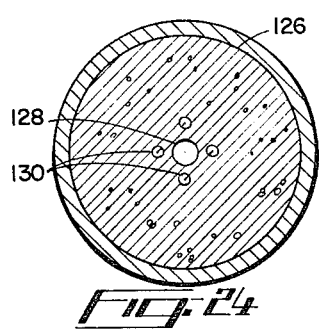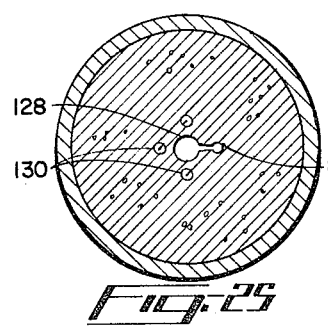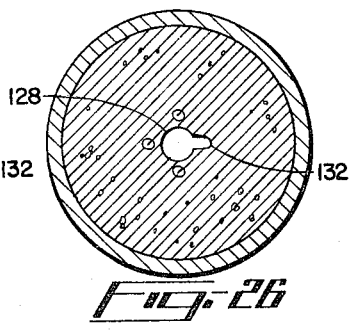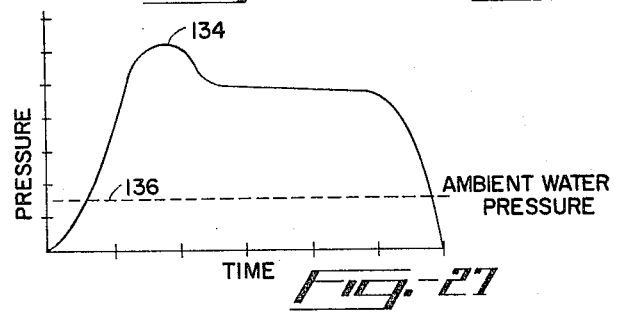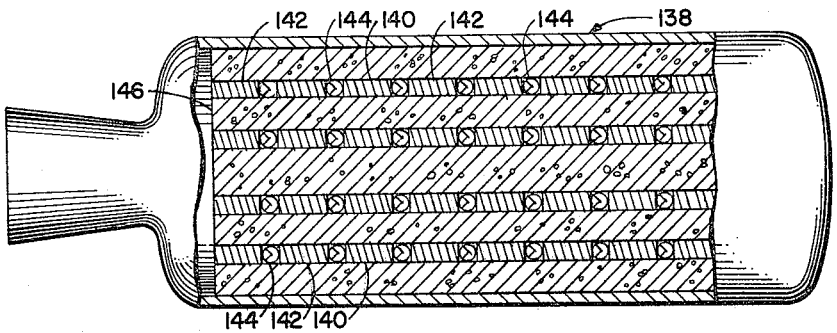
INVENTORS
DAVID V. PAULSON
LUBOMYR KURYLKO
LOUIS ZERNOW
BY
ATTORNEY

United States Patent Office 3,266,240
Patented August 16, 1966

3,266,240
THRUST CONTROL OF SOLID PROPELLANT ROCKETS
Lubomyr Kurylko, Alexandria, Va., and Louis Zernow, Glendora, and David V. Paulson, Long Beach, Calif., assignors to Aerojet-General Corporation, Azusa, Calif., a corporation of Ohio
Filed Apr. 12, 1962, Ser. No. 186,900
19 Claims. (Cl. 60—35.6)

This invention relates to solid propellant rockets and more particularly to a thrust modulated solid propellant rocket motor.

Solid propellant rockets offer a number of advantages over liquid fuel or hybrid rockets because of their greater simplicity and reliability. In addition, they can be stored indefinitely and fired quickly without last minute preparations. However, liquid fuel or hybrid rockets have had a few important advantages over solid propellant rockets in that they possess thrust control and restart capability. This ability to control or modulate thrust at will and to stop or start the rocket engines as desired has permitted the liquid fuel or hybrid rocket to be used for a wide variety of purposes, despite their greater complexity and lower inherent reliability. In contrast, solid propellant rockets have heretofore been restricted to uses where thrust control and restart capability is not important.

It is apparent, however, that if a solid propellant rocket could be provided with thrust control and restart capability, then it could be used in all applications heretofore restricted to liquid fuel or hybrid rockets and the resultant rocket would be superior to conventional liquid fuel rockets from the point of view of simplicity, reliability, storability, and readiness to fire. In addition, variations in the thrust of the rocket motor, due to variations in the ambient temperature, propellant composition, etc., can be compensated for in flight.

What is needed, therefore, and comprises an important object of this invention is to provide a solid fuel rocket with thrust control and restart capability.

Another object of this invention is to provide a solid fuel rocket with means for efficiently utilizing residual grain slivers.

Still another object of this invention is to provide propellant grains for a solid fuel rocket with a means for changing the initial burning configuration to other desired burning configurations. A side advantage of this concept is to permit a higher mass to volume ratio for solid propellant motors.

A further object of this invention is to provide a solid fuel rocket motor which can be ignited and burned under water at any depth or in the near vacuum conditions of space.

The invention in its broadest aspect relies on the fact that the thrust of a given solid fuel rocket increases with an increase in mass flow rate which in turn is dependent on the propellant burning rate and the total burning area of the propellant grain and on the discovery that an explosive shaped charge can be ignited inside a propellant grain for causing a perforation in the grain without causing the grain to explode. This perforation increases the burning surface and hence the thrust of the rocket motor. Because propellant burning rates generally increase with increasing pressures, additional increase in mass flow rate and thrust is indirectly caused by the increased burning surfaces which cause increased chamber pressures.

These and other objects of this invention will become more apparent when read in the light of the accompanying drawings wherein:

FIGURE 1 is a perspective view of segments of a longitudinal section of a solid propellant rocket motor with an internal-burning grain possessing thrust modulation capability and showing in particular the linear shaped charges embedded therein;

FIGURE 2 is a cross-sectional view of the rocket with the thrust modulated solid propellant grain shown in FIGURE 1;

FIGURE 3 is a cross-sectional view disclosing the solid propellant grain shown in FIGURE 2 with one group of linear shaped charges fired to form four equally spaced linearly extending grooves in the grain communicating with the burning surface;

FIGURE 4 is a cross-sectional view of the propellant grain shown in FIGURE 2 wherein four additional shaped charges have been fired to provide an additional thrust increase;

Figure 5:
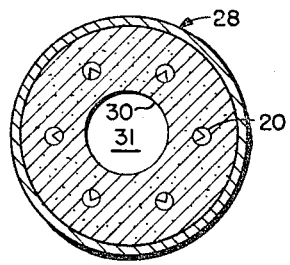
Figure 6:
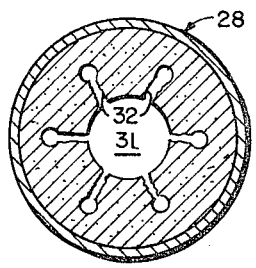
Figure 7:
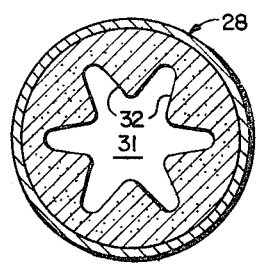
Figure 8:
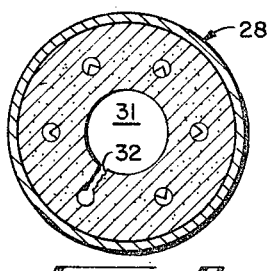
Figure 9:
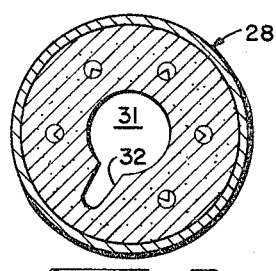
Figure 10:
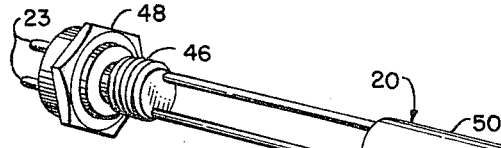
Figure 11:
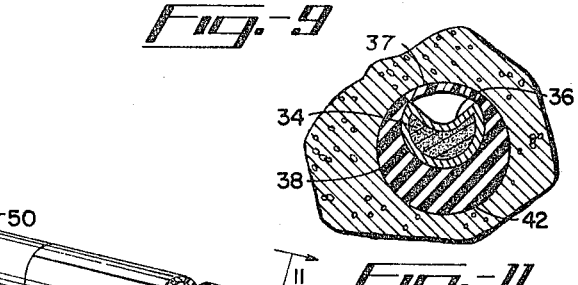
Figure 12:
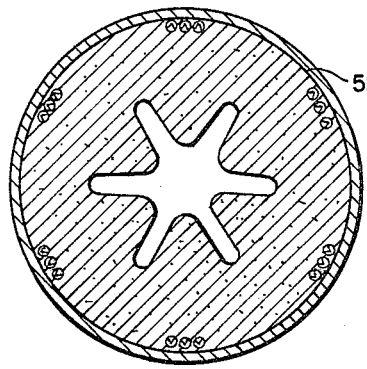
Figure 13:
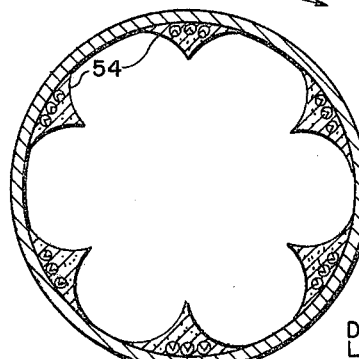
Figure 14:
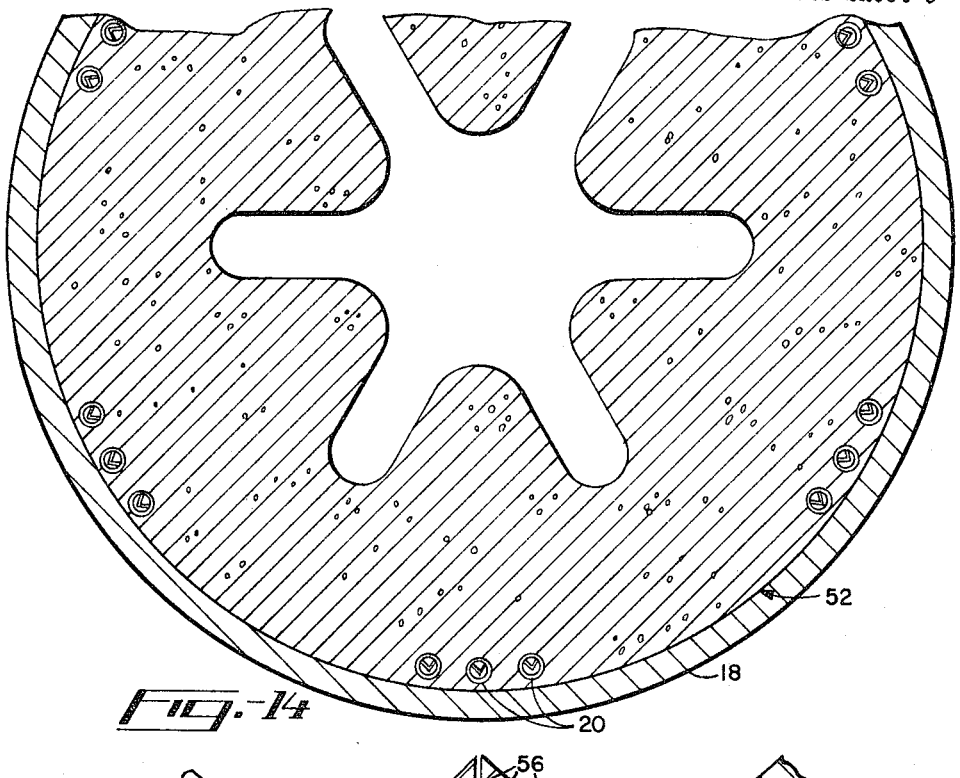
Figure 15:
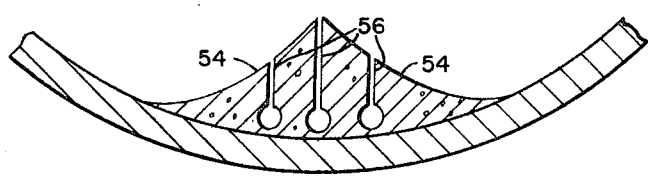
Figure 16:
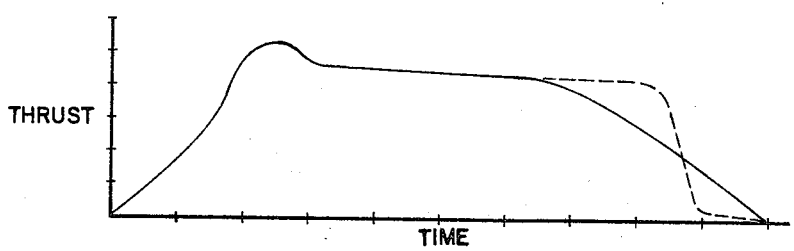
Figure 20:
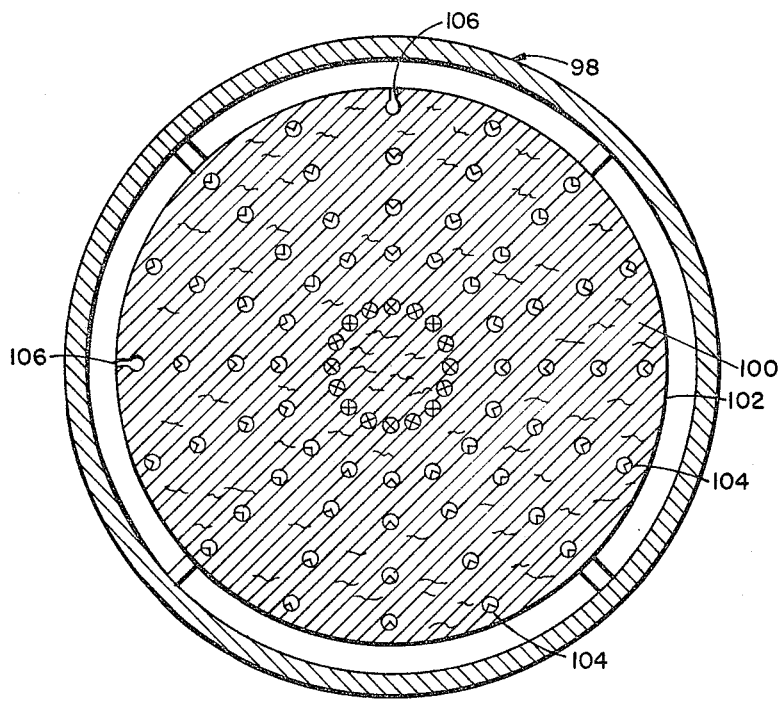
Figure 21:
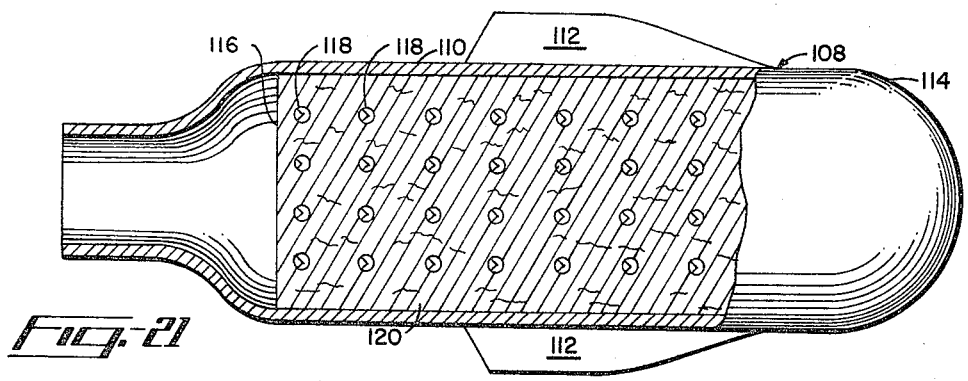
Figure 22:
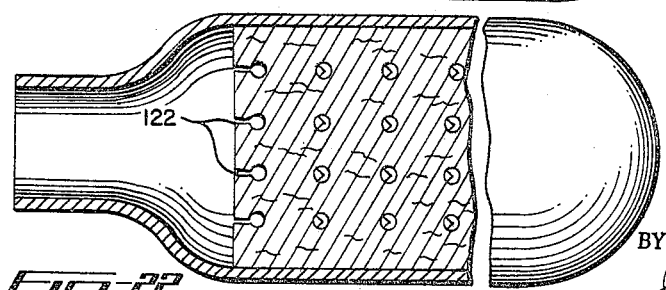

FIGURE 5 discloses a cross-sectional view of a tubular solid propellant grain forming a matrix with linearly shaped charges embedded therein;

FIGURE 6 is a cross-sectional view of the propellant grain shown in FIGURE 5 with all the shaped charges fired to form six linearly extending angularly spaced grooves in the propellant grain;

FIGURE 7 is a cross-sectional view disclosing the propellant grain shown in FIGURE 6 after the size of the initial grooves formed by the ignition of the shaped charges has increased due to normal propellant burning, thereby producing a conventional star-shaped burning pattern;

FIGURE 8 is a cross-sectional view disclosing the propellant grain shown in FIGURE 5 but with only one shaped charge fired to form a single linearly extending groove communicating with the inner burning surface;

FIGURE 9 is a cross-sectional view disclosing the propellant grain shown in FIGURE 8 after the size of the groove has increased slightly due to normal propellant burning to produce a typical key-shaped burning pattern;

FIGURE 10 is a perspective view of a linear shaped charge used with solid propellant grains in this invention;

FIGURE 11 is a sectional view taken on the line 11—11 of FIGURE 10 and shown positioned in a bore in the propellant grain;

FIGURE 12 is a cross-sectional view of a solid propellant grain having a star-shaped burning pattern and showing the distribution of sliver removing shaped charges embedded in the grain;

FIGURE 13 is a cross-sectional view of the slivers remaining in the housing of a solid propellant rocket motor after the remainder of the solid propellant has been burned;

FIGURE 14 is an enlarged cross-sectional view of a portion of a rocket motor housing shown in FIGURE 12;

FIGURE 15 is an enlarged cross-sectional view of a portion of the housing of the solid propellant rocket motor shown in FIGURE 13, after the shaped charges embedded in the sliver have been fired;

FIGURE 16 is a diagram showing the improvement in thrust characteristics produced by more efficient utilization of the slivers;

FIGURE 17 is a longitudinal sectional view disclosing a restartable thrust modulated rocket motor wherein the end-burning propellant grain is formed from a plurality of disk shaped segments separated from each other by an inert material, and wherein each of the segments is provided with a number of shaped charges embedded therein;

FIGURE 18 is a perspective view partly in section of a semi-cylindrical segment of a modified restartable solid propellant rocket motor having thrust modulation capability wherein the grain segments are tubular and internal-burning in shape and are separated from each other by tubular inert material;

FIGURE 19 is a longitudinal sectional view disclosing a restartable thrust modulated solid propellant rocket motor composed of a single cast propellant grain with a plurality of groups of shaped charges embedded therein;

FIGURE 20 is a cross-sectional view of a modified solid propellant grain with a regressive burning characteristic (external-burning grain), and having a plurality of groups of linear shaped charges embedded therein for giving the rocket motor restart capability and thrust modulation;

FIGURE 21 is a longitudinal sectional view, partially shown in elevation, of an underwater solid propellant rocket motor with an end-burning propellant grain wherein a plurality of groups of shaped charges are embedded in the propellant grain both for igniting the propellant grain at varying depths under water and for providing the rocket motor with thrust modulation characteristics;

FIGURE 22 is a longitudinal sectional view, partially shown in elevation, of a portion of the rockets motor shown in FIGURE 21 after the first group of shaped charges have been fired to ignite the propellant grain;

FIGURE 23 is a longitudinal sectional view, partially shown in elevation, of a modified underwater rocket motor wherein the propellant grain is tubular and internal-burning, with linear shaped charges embedded therein;

FIGURE 24 is a cross-sectional view of the underwater rocket motor shown in FIGURE 23;

FIGURE 25 is a cross-sectional view disclosing the rocket motor shown in FIGURE 24 with one of the linears shaped charges fired to start the motor;

FIGURE 26 is a cross-sectional view disclosing rocket motor shown in FIGURE 25 after the entire surface of the inner bore of the propellant grain has become ignited;

FIGURE 27 is a diagrammatic view showing the pressure changes inside the tubular bore of the propellant grain in the rocket motor of FIGURE 23 in relation to the ambient water pressure; and FIGURE 28 is a longitudinal sectional view, partially shown in elevation, of another solid propellant rocket motor having shaped charges disposed therein in accordance with the present invention.

Referring now to FIGURE 1 of the drawing, a thrust modulated solid propellant rocket indicated generally by the reference numeral 10 comprises a generally cylindrical rocket motor housing 12 and a suitable exhaust nozzle 14. A tubular solid propellant grain 16 with a bore 17 is mounted inside housing 12 and is held in position in the housing by means of a suitable restriction 18. A plurality of groups of linear shaped charges are removably mounted in bores formed in the propellant grain.

As best seen in FIGURE 2, the shaped charges 20 in this particular embodiment, are disposed in three radially spaced groups with the shaped charges in each group in angularly spaced relationship to each other. The first group of shaped charges is nearest to the inner initial burning surface 22 of the tubular solid propellant grain. The shaped charges are fired electrically by connecting an electric source to shaped charge leads 23 (see FIGURE 1). It is apparent therefore, that one or more of the shaped charges can be fired simultaneously by connecting leads 23 in parallel and connecting an electric source to them in a manner well-known in the art.

In the example shown in FIGURE 2, four shaped charges in the first group are disposed in uniform angularly spaced relationship to each other. These shaped charges can be fired either singly or in combination by connecting them together in a suitable electric circuit. FIGURE 3 illustrates a situation where all of the shaped charges in the first group have been fired simultaneously. As seen when these charges are fired, they form elongated axially extending grooves 24 in surface 22 running the length of the propellant grain.

When the shaped charges 20 are ignited, they form jets of metal which force their way through the propellant grain. These jets of metal ignite the propellant grain so that the surfaces of grooves 24 spread to surface 22 and the exhaust gases stream out of nozzle 14 to provide thrust.

As stated above, the thrust of a solid propellant rocket grain is dependent on the area of the burning surface. With a conventional igniter, the initial burning surface would be surface 22 and its total initial burning area would be determined by simple geometric considerations. It is apparent, however, that if shaped charges are fired through the propellant they substantially increase the total area of the burning surface so that the thrust of the rocket motor is increased. It is apparent that by igniting varying numbers of the shaped charges 20 in each group, the initial starting thrust of the rocket motor 10 could be varied as desired.

The tubular solid propellant grain 16 shown in FIGURE 2 has an increasing burning rate characteristic in that as the propellant grain burns, the size of the bore increases (see FIGURE 4). If, however, it is desirable to provide a greater increase in thrust than would normally occur during the burning of the grain, the next group of shaped charges 20 would be fired when the burning surface 22 of the bore approaches to within a predetermined distance of these shaped charges. This next group of shaped charges would form grooves 26 in the solid propellant grain to provide a still greater increase in burning surface area. Obviously, all or any part of the shaped charges in the second group could be fired in accordance with the thrust requirements of the rocket. Similarly, as the size of the bore 17 increases after the propellant grain has burned for a time, and its burning surface 22 moves to within a predetermined distance of the next group of shaped charges, these shaped charges can be fired in the number required to provide the thrust characteristics desired.

Thus, it can be seen that the shaped charges embedded in or directed against a surface of the grain of the solid propellant rocket have a dual function in that they ignite the grain, thus eliminating prior conventional igniters and in addition, by perforating the grain, they provide a means for modulating or varying the thrust characteristics of the propellant grain.

Although the propellant grain shown in FIGURE 1 is tubular with an initial inner burning surface 22 in the bore 17 of the grain, it is apparent that the grain could have other configurations. For example, it could be an end burning grain or a grain with a star-shaped burning pattern. Similarly, instead of using shaped charges, circumstances may require that the propellant grain be perforated by an inert material, such as a projectile or bullet. The latter might be important if the propellant grain had unstable burning characteristics and it was found that the use of shaped charges could explode the propellant grain rather than simply perforating it. In addition, although the shaped charges are disclosed as being embedded in the grain, it is contemplated that they could be in spaced relation to a surface of the grain and at a distance sufficient to form grooves in the grain when they are fired.

The technique of using shaped charges for two purposes, that is, the ignition of the propellant grain and its perforation, requires the selection of a propellant grain having reasonably stable characteristics; otherwise, the ignition of a shaped charge therein could cause the propellant grain to explode. It has been found that a conventional propellant grain composed of ammonium perchlorate, 65% by weight, powdered aluminum, 17% by weight, and a binder, such as polyurethane, 18% by weight, possesses the desired stable characteristics which permit shaped charges to be fired therein without danger of explosion.

As stated above, the thrust of a solid propellant grain in a solid propellant rocket motor is related to the area of the burning surface, and in general, the greater the area of the burning surface of the grain, the greater the thurst. To take advantage of this characteristic, propellant grains are cast into a large variety of different configuration. Some, such as end burning cylindrical propellant grains provide a constant thrust because the area of the burning end of the propellant grain is constant. Other propellant grains, such as cylindrical grains with an external-burning surface have a regressive thrust characteristic because the grain burns from the outside in, and as it burns, the area of the burning surface decreases. Other propellant grains, such as tubular propellant grains with an internal burning surface, have what is called progressive burning characteristics with increasing thrust characteristics in that the size of the burning surface increases. Other propellant grains have the well-known star-shaped grain configuration or the key-shaped grain configuration, etc., and the selection of the burning configuration of the propellant grain depends on the requirements of the particular mission.

Heretofore, once the mission requirement of the solid propellant rocket motor was determined, the propellant grain had to be specially cast to provide the particular thrust program required. This made the use of solid propellant rockets quite expensive and inflexible.

Since, as described above, the thrust or burning pattern of a solid propellant grain can be modulated by igniting shaped charges to form recesses therein, this characteristic can be utilized in the formation of a standard propellant grain as a matrix with a plurality of shaped charges embedded therein. Thus when different combinations of shaped charges are fired, the propellant grain will have different initial thrust and burning rate characteristics.

An example of a standardized propellant grain is shown in FIGURE 5 and indicated generally by the reference numeral 28. The propellant grain in this particular embodiment is tubular in form with an internal burning surface 30 and a bore 31. A plurality of shaped charges 20 are disposed around the axis of the propellant grain in uniform angularly spaced relation to each other and in operative association with the burning surface 30.

In the embodiment shown, the standard propellant grain is provided with the six linearly shaped charges and if these are ignited simultaneously, they form six grooves 32 in the propellant grain which communicate with the bore 31 (see FIGURE 6). As the propellant grain burns, the grooves 32 gradually assume the configuration shown in FIGURE 7 which is the characteristic star-shaped burning pattern. Heretofore, this burning pattern was obtainable only by carefully molding propellant grain around a suitable mold. However, with this arrangement, it can be achieved by simply embedding the shaped charges in a proper position in the propellant grain and igniting them simultaneously.

If a propellant grain with a key-shaped burning characteristic is desired, only a single shaped charge 20 is ignited to form a single recess 32 as shown in FIGURE 8. This recess, as the propellant grain burns, gradually assumes the form shown in FIGURE 9, which is a typical key-shaped burning pattern. The remaining shaped charges will not fire until the burning surface reaches them and when they do fire, they will not perforate the grain or alter its burning rate characteristics. Thus, by the simple expedient of exploding different combinations of shaped charges embedded in a standard grain, a substantial alteration of the burning characteristics of the grain can be easily achieved without the expense of resorting to a separate time-consuming molding operation in the fabrication of each grain. It is also apparent that propellant grains having any desired burning characteristics can be obtained, utilizing the principles described above.

The linear shaped charges 20 embedded in the propellant grains shown in the drawings are constructed as best seen in FIGURES 10 and 11. The explosive 34 is clad in lead 36 or some other suitable metal. To prevent side shocks from causing unpredictable fractures in the propellant grain, the explosive and lead cladding are embedded in a shock attenuant 38. The shock attenuant is composed of rubber, epon, and micro balloons, and it has been found that when the linear shaped charge is surrounded by the shock attenuant, the shaped charge is able to form a clean groove in the desired direction without undesirable side fracturing.

The propellant grain is provided with an elongated linearly extending bore 42 for receiving the linear shaped charge. A shield 37 which may be of plastic or some other suitable material is placed in the bore to keep propellant from falling into the groove in the shaped charge 20 and interfering with the performance of the shaped charge.

End 46 of the shaped charge is threaded and a bolt 48 is secured thereto for removably mounting the shaped charge inside the propellant grain. The electrical leads 23 extend through bolt 48 and threaded member 46 into a detonator 50 in a manner well-known in the art. In this way, when an electrical voltage is connected to leads 23, a linear shaped charge is ignited.

In some circumstances, depending on the burning configuration, the combustion of the propellant grain may not be complete. For example, a propellant grain with a star-shaped burning pattern, as indicated by the reference numeral 52, shown in FIGURE 12, may not burn completely. Instead, when normal combustion is finished, a plurality of uniformly angularly spaced slivers 54 may remain (see FIGURE 13).

The unburned slivers represent propellant which will not burn at the designed chamber pressure and will provide a loss in motor efficiency. These slivers form because of imperfect burning of the propellant grain, or poor design, or because of both conditions. In a propellant grain with a star-shaped pattern, the arms of the star burn through to the inner surface of the housing before other portions do, causing an abrupt decrease in the area of the burning surface and leaving slivers of unburned or slowly burning propellant.

Furthermore, depending on the grain composition, even where the slivers burn completely, their decrease in burning area produces a decrease in thrust and in increase in burning time. This increase in burning time at lower thrust levels introduces a negative factor in the burnout velocity of the rocket, thereby decreasing rocket performance.

If the propellant grain is in the million-pound thrust class, the total weight of these slivers may be very large, representing a substantial loss in otherwise available energy and a decreased performance by the rocket. Since the ignition of shaped charges in a solid propellant has the effect of increasing the area of a burning surface, a complete combustion of the slivers or a more rapid combustion of the slivers at an elevated thrust level in a solid propellant rocket is possible if one or more linear shaped charges are embedded in portions of the propellant grain which experience has shown form the slivers.

In the embodiment shown in FIGURE 13, three linear shaped charges are embedded in each of the sliver forming portions, and after the propellant grain 52 has just about reached the point of burn-out, leaving one or more of the slivers 54 intact, the shaped charges 20 are detonated, forming a plurality of grooves 56 in the sliver (see FIGURE 15). The manner of these grooves is selected to increase the area of the burning surface of the sliver to an extent necessary to maintain chamber pressures and a sufficiently high thrust level.

The effect of utilizing the slivers more efficiently is shown in the diagram in FIGURE 16 wherein the solid line represents the thrust performance as a function of time when the slivers are not utilized, and the dotted line represents the effect of igniting shaped charges in the slivers so that the slivers are more completely burned. It is apparent that in a conventionally designed rocket the thrust falls off before the propellant grain has been completely consumed. In contrast, by properly utilizing the energy in the propellant grain through the use of shaped charges, the thrust is more nearly constant until burnout.

As stated above, one of the objects of this invention is to provide a solid propellant rocket with restart capability so that the solid propellant rocket can be used in areas heretofore restricted to liquid fuel or hybrid rockets. The restartable solid propellant rocket 58 shown in FIGURE 17 comprises an end-burning solid propellant grain composed of a plurality of cylindrical disks 60 stacked one on top of each other and separated from each other by a frangible inert material 62. Each of the disks 60 is formed with point source shaped charges 64 embedded therein, although it is to be understood that linear, circular, and other shaped charges could also be used. In the embodiment shown, the central shaped charge in the propellant grain segment adjacent nozzle 66 has been fired to form a burning recess 67 in the propellant grain. If a greater initial starting thrust is required, the other shaped charges in this grain segment could also be fired.

With this arrangement, it is apparent that when the propellant grain in the propellant disk 60 adjacent nozzle 66 has been completely burned, the inert material 62 will prevent the next adjacent propellant disk from igniting. Consequently, rocket motor 58 will periodically stop as each propellant disk is consumed. To restart the motor, the shaped charges in the next adjacent disk must be ignited. When this happens, the frangible inert material 62 will be shattered, permitting the propellant disk to burn. Furthermore, the presence of additional shaped charges embedded in the propellant disks permits the thrust produced by each propellant disk to be controlled, as described above.

Another embodiment of a restartable rocket motor 68 is shown in FIGURE 18. In this motor, the propellant grain 70 is tubular and is composed of concentric tubular grain segments 72 and 73 concentric with each other around the axis of the motor housing 74 and separated from each other by tubular frangible inert material 76. Each of the grain segments is provided with a plurality of linear shaped charges 20 embedded therein. When one or more of the shaped charges in grain segment 72 are ignited, they form one or more grooves 78 in the grain segment. This ignites the inner surface 80 of the tubular bore 81 in the grain. The large number of shaped charges embedded in each grain segment permits a selective variation in the initial thrust capability in the rocket motor.

It is apparent that as the inner grain segment 72 is consumed, the inert material 76 prevents the adjacent grain segment 73 from burning so that the motor stops operating. To restart rocket motor 68, it is necessary only to ignite one or more of the shaped charges in the adjacent grain segment 73. This would shatter the inert material 76 so that the fragments blow out of the rocket motor housing through the nozzle 82, permitting the inner surface of propellant grain segment 73 to burn.

When the propellant grain is very large, the weight of the inert material separating the grain segments may be objectionable. In addition, it may be desirable to be able to shut down the rocket motor quickly without waiting for a grain segment or disk to burn out. Consequently, it would be desirable to provide a restartable rocket motor with a one-piece propellant grain. This is made possible by the discovery that under extremely low ambient pressures such as are encountered in outer space, sustained propellant grain combustion for certain polyurethane based propellants is possible only if the relation of the area of the burning surface of the propellant grain to the cross-sectional area of the throat of the nozzle has a predetermined ratio. Other compositions of propellant grain inside the rocket motor may not burn even at atmospheric nozzle exit pressures, if the relationship between the burning surface area to the throat area is below a critical value. If these conditions are not satisfied, the propellant grain will stop burning. This is because the flame front on the burning surface of a propellant grain moves away from the burning surface under low combustion pressure chamber conditions. Consequently, if the burning surface area to throat area ratio is too small, the flame front will be unable to transfer sufficient heat to the burning surface to maintain combustion.

In the case of the propellant grain described above, this critical ratio is approximately 16; that is, the area of the burning surface must be at least 16 times the area of the throat. However, variations in composition of the propellant grain will effect this critical ratio, and for any particular composition, the critical ratio may be determined experimentally.

The restartable rocket motor 84, shown in FIGURE 19, is provided with an end-burning propellant grain 86. The housing 88 of the rocket motor is provided with a nozzle 90. The dimensions of the throat 92 of the nozzle 90 are selected so that the ratio between the area of the burning end 94 of the propellant grain to the area of the nozzle is just below the critical level required for sustained combustion under conditions of low ambient pressure. It is apparent, therefore, that the rocket motor cannot function under these conditions. If, however, the area of the burning surface could be increased slightly so that the ratio is above the critical level, then the propellant grain would burn under conditions of very low ambient pressure.

To prevent this increased burning area, the propellant grain 86 is provided with a plurality of point or curvilinear shaped charges 93. These shaped charges are disposed in a plurality of groups with the various groups at increasing distances from the initial burning surface 94. To start the motor, one or more of the shaped charges in the group nearest the burning surface 94 are ignited. The ignition of the shaped charge forms a groove or recess 96 in the propellant grain 86 which increases the area of the burning surface 94. If the dimensions of the propellant grain are properly selected, this increase in area is sufficient to raise the ratio of the area of the burning surface 94 to the area of the throat 92 above the critical level where sustained combustion is possible. Consequently, the propellant grain will continue to burn. In the embodiment shown, propellant grain 86 is designed so that the groove or recess 96 formed by firing only one shaped charge in the group nearest the burning end surface 94 is sufficient to start combustion. The remaining two shaped charges in the group are available in case increased thrust is desired.

It is apparent that as the end surface 94 of the propellant grain burns upwardly, the depth of the groove or recess 96 will gradually decrease, causing the area of the burning surface to decrease and fall below the critical level where sustained combustion is no longer possible. When that happens, the motor will automatically stop burning. If it is desired to maintain a continuous combustion of the propellant grain, one or more of the shaped charges in the next adjacent group must be fired before combustion in the burning surface 94 stops, in order to maintain the area of the burning surface large enough so that the ratio of the burning surface area to the area of the throat is above the critical level. Since the rate at which the propellant grain burns is known, the rate at which shaped charges in the adjacent groups of shaped charges must be fired for continuous combustion can be determined. Since the shaped charges are fired electrically, they can be ignited at the desired rate by any conventional means such as a power driven rotary switch which sequentially engages contacts associated with one or more of the shaped charges in each of the groups of shaped charges.

When it is desired to shut down the motor, it is only necessary to stop the ignition of the shaped charges. With this arrangement, the solid propellant rocket motor will have restart capability because when it is desired to restart the engine, it is only necessary to ignite the shaped charges in the next group of shaped charges adjacent the burning surface 94. By providing more shaped charges than are necessary to maintain combustion, it is possible to provide the solid propellant motor with restart capability and complete thrust modulation in that the thrust of the rocket motor can be increased or decreased by sequentially firing a predetermined number of the shaped charges in each group.

In some circumstances, a propellant grain with an end burning characteristic may not be desirable. In the embodiment shown in FIGURE 20, the rocket motor 98 is provided with an end anchored solid propellant grain 100 with an outer cylindrical burning surface 102. It is apparent that as the propellant grain 100 burns, its radius decreases so that the area of the burning surface decreases. Consequently, the propellant grain will have a regressive burning surface. As the burning surface decreases, the thrust of the rocket motor 98 would normally fall off, and under conditions of low ambient pressure, the ratio of the area of the burning surface 102 to the area of the throat of the nozzle (not shown) may fall below the critical value where combustion is no longer possible. To prevent this from happening, a plurality of groups of linear shaped charges 104 are embedded in the propellant grain at varying distances from the axis of the propellant grain.

In operation, as the outer surface of the propellant grain burns and thereby decreases in size approaching the critical value, one or more of the shaped charges in the outermost group can be fired to form grooves 106. These grooves have the effect of increasing the area of the burning surface, offsetting the decrease due to the combustion of the propellant grain. By firing off the shaped charges in the various groups in appropriate sequence, the total burning area of the propellant grain can be maintained above the critical value despite the normal regressive burning characteristics of the grain. In this way, sustained combustion is possible. It is noted that the density of shaped charges in the groups nearest the axis of the propellant grain is substantially greater than the density of shaped charges in the outermost groups. This is because the area of the burning surface toward the end of combustion of the grain is so small that a very large number of grooves are necessary to provide enough surface to maintain combustion. In addition, by sequentially firing off numbers of shaped charges above the level required to maintain combustion, any variation in the number of shaped charges fired permits an increase or decrease in thrust.

The principles of this invention can also be applied to the ignition of solid propellant grains under water and control of underwater solid propellant rocket motors. In underwater solid propellant rocket motors, it is important to be able to force the water away from the burning surface of the rocket propellant so that the temperature of the burning surface will be sufficiently high to start and maintain combustion. This has been done in the underwater solid propellant rocket motor 108 shown in FIGURE 21. This rocket motor comprises a housing 110, fins 112, and a payload carrying chamber 114. The solid propellant grain is cylindrical and has an end burning surface 116. A plurality of groups of shaped charges 118 which may be point source or curvilinear shaped charges are embedded in the propellant grain 120.

To operate the motor, the shaped charges in the group nearest the burning end surface 116 are fired. As shown in FIGURE 22, the shaped charges form grooves 122. The heat generated causes the sides of the grooves to ignite. The number of shaped charges fired and the number of grooves produced is sufficient so that when all of the shaped charges in a group are fired, the initial effect is that a substantial portion of the end surface 116 of the propellant grain becomes ignited and the gas pressure produced by the combustion of the propellant grain is sufficient to force water completely out of the motor housing 110.

It is apparent that as the surface of the propellant grain 120 burns, the grooves 122 will gradually flatten out, decreasing their total surface area. If the underwater rocket motor is operating close to the surface (comparatively low water pressure), the area of the burning surface 116, after ignition, may be sufficient to generate enough pressure to keep the water out of the housing. However, in order to use the underwater solid propellant rocket motor at greater depths, additional groups of shaped charges 118 may have to be fired in order to maintain the total area of the burning surfaces at a level sufficient to maintain enough gas pressure in the interior of the housing 110 to keep water out therefrom. To provide the solid propellant rocket motor 108 with the capacity to function at varying depths, the propellant grain 120 shown in FIGURE 21 is provided with a plurality of axially spaced groups of shaped charges. These shaped charges can be fired in sequence, using any suitable means, so that, depending on the water pressure, the total burning area of the propellant grain can be increased to the level sufficient to generate enough gas pressure to keep water away from the propellant grain and out of the housing to maintain combustion with the exhaust gases leaving the housing for providing thrust.

Another embodiment of an underwater solid propellant rocket motor 124 is shown in FIGURE 23. This rocket motor is provided with a tubular propellant grain 126 having an axial bore 128.

A plurality of linear shaped charges 130 are disposed about the axis of bore 128, as best seen in FIGURE 24. To operate the solid propellant rocket motor, one or more of the shaped charges are fired to form grooves 132, communicating with bore 128. In the embodiment shown in FIGURE 25, only one of the shaped charges has been fired, producing a single groove. Depending on the pressure of the water, the burning of the walls of groove 132 generates sufficient gas to force water entirely out of bore 128. If the rocket 124 is fired at greater depth, the gas pressure produced by firing a single linear shaped charge may not be sufficient to force water out of the bore and it may be necessary to fire one or more of the remaining shaped charges.

A solid propellant with an internal bore has what is termed a progressive burning characteristic, and as seen in FIGURE 26, both the size of the groove 132 and the size of the bore 128 will increase, thereby increasing the amount of gas produced. By careful design, this increase in the size of the bore and the size of the groove may be sufficient to keep water out of the bore 128 during the course of the combustion of the grain because as the volume of the bore 128 and the groove 132 increases, more gas is generated, and the gas pressure in the bore can be maintained sufficiently high to keep water out of the bore and entirely out of the rocket motor housing.

The relationship of the pressure in the bore 128 as a function of time is indicated by the diagram shown in FIGURE 27. In this diagram, the peak portion 134 represents the pressure generated by the initial firing of one or more of the shaped charges. The dotted horizontal line represents the ambient water pressure. So long as the gas pressure in the bore is greater than the ambient water pressure, the water is kept out of the bore and the combustion can continue. In this way, underwater solid propellant rockets can be provided with restart capability. In addition, thrust modulation capability is possible by carefully designing the propellant grain with a sufficient number of shape charges embedded therein, and carefully programming the rate of firing of the shaped charges in accordance with the requirements of the mission. In some situations, depending on the composition of the propellant grain, the use of shaped charges powerful enough to perforate the propellant grain may not be feasible because the physical characteristics of the grain may cause the grain to shatter instead of having a clean-cut recess formed therein, or because the size of the shaped charge necessary to perforate the grain could cause the grain to explode when the shaped charge is fired.

The solid propellant rocket motor 138 shown in FIGURE 28 is designed so a propellant grain having these physical and chemical characteristics can be provided with restart capabilities or with thrust modulation. To do this, the propellant grain may be provided with a plurality of bores or recesses 140 extending therethrough. These bores are plugged with a plurality of segments 142 of inert material which are in spaced relation to each other. Each of the spaces between adjacent segments 142 may be filled with a shaped charge 144 as shown. These shaped charges are designed so they can be fired in sequence toward the burning surface 146 which, in the particular example shown, happens to be the end of the grain.

As the shaped charges are fired, they force the inert segments 142 nearest the burning surface 146 out of the end of the bore 140 and ignite the walls of that portion of the bore to increase the area of the burning surface and provide increased thrust. Alternatively, depending on the design of the rocket motor housing, they provide the rocket motor with restart capability as described above.

If the propellant grain composition is such that it is not feasible to fire shaped charges in the bore because of danger of explosion, bullets may be substituted for the shaped charges to force the inert segments out of the bore. Alternatively, electrically fired gas generated pellets may be placed between the inert segments 142 and designed so that when they are fired, the resulting gas pressure forces the inert segments adjacent the burning end 146 of the propellant grain out of the bores 140 to provide an increase in the area of the burning surface.

The method and apparatus described above for thrust control of solid propellant rockets may have wider applications. For example, the concept could be used for the control of power in a gas generator for running turbines. Another application might be for the selective pressurization of a non-static system such as the pressurization of fuel tanks in a liquid propellant propulsion system. A third potential application is in restartable solid propellant cartridges for restarting engines and pumps used in vehicles.

It is to be understood that the forms of the invention herewith shown and described are to be taken only as preferred examples of the same, and that various changes in the shape, size and arrangement of the parts may be resorted to without departing from the spirit of this invention or the scope of the claims.

We claim:

1. A gas generator comprising in combination a housing, a gas generating grain mounted in said housing, said gas generating grain having a burning surface, means in said housing associated with said gas generating grain for igniting said grain, and shaped charge means located in said gas generating grain for perforating the grain upon ignition to form recesses therein for communication with the burning surface to increase the area of the burning surface and thereby provide increased gas pressure.

2. A solid propellant rocket comprising in combination a housing, a propellant grain mounted in said housing, said propellant grain having a surface adapted to be ignited, a plurality of shaped charge means in said propellant gain at selected distances from said surface and directed theretoward, means for igniting said surface, and means for firing one or more of the shaped charge means when the ignited surface burns to within a predetermined distance of said shaped charge means to create one or more recesses in the propellant grain communicating with the burning surface, so that depending on the number of shaped charge means fired, the area of the burning surface, and hence the thrust of the rocket, can be increased so that by controlling the number of firings of the shaped charge means in the propellant grain, the thrust of the rocket can be controlled.

3. A solid propellant rocket motor comprising in combination an axially extending propellant grain, said propellant grain having a surface adapted to be ignited, means for igniting said surface, a plurality of groups of shaped charges embedded in the propellant grain and directed toward said surface, the shaped charges in one group being in angualrly spaced relation to each other at a predetermined distance from the axis of the grain, other groups of shaped charges being at selected distances from the axis of the grain, and means for controlling the number of shaped charges to be ignited in each group whereby as the burning surface of the propellant grain burns to within a predetermined distance of each group, the number of shaped charges ignited in the group and forming recesses in the propellant grain which communicate with said burning surface will control the thrust augmentation by the shaped charges in that group.

4. A solid propellant rocket motor comprising a housing, a standard propellant grain mounted in the housing and having a surface to be ignited, a plurality of shaped charges embedded in the propellant grain and directed toward said surface to be ignited, and means for igniting selected combinations of the shaped charges to form a selected configuration of burning recesses in the propellant grain whereby the standard propellant grain can be changed to have any desired burning pattern.

5. A restartable solid propellant rocket motor comprising a propellant grain, a plurality of partitions embedded in the propellant grain to separate the grain into discrete grain segments, each of said grain segments having at least one surface to be ignited said partitions being formed from a frangible inert material, shaped charge means embedded in each of the grain segments and directed toward a respective one of said surfaces, and means for igniting the shaped charge means so that the segments of the propellant grain can be ignited separately by igniting the shaped charge means embedded therein, whereby as each grain segment burns out, the inert partitions separating the grain segments from each other prevent the next adjacent grain segment from igniting, thereby shutting down the motor, whereby the propellant grain can be re-ignited by igniting the shaped charge means in an adjacent segment.

6. A restartable solid propellant rocket having a combustion chamber and a nozzle comprising a generally cylindrical end-burning grain, a plurality of planar partitions separating the grain into discrete cylindrical grain segments stacked in end-to-end relationship, said partitions being formed from an inert material, at least one shaped charge embedded in each of the grain segments and directed toward said nozzle, and means for igniting the shaped charges so that the segments of the propellant grain can be ignited separately by igniting one or more of the shaped charges embedded therein, whereby as each grain segments burns out, the inert partitions separating the grain segments prevent the next adjacent grain segment from igniting, thereby shutting down the rocket, whereby the propellant grain can be re-ignited when desired by igniting one or more of the shaped charges in the next adjacent segment.

7. A restartable thrust modulated solid propellant rocket having a combustion chamber and nozzle comprising a generally cylindrical side burning propellant grain, at least one generally cylindrical partition separating the grain into discrete concentric grain segments, said partition being formed from an inert frangible material, a plurality of shaped charges embedded in each grain segment and directed radially toward the longitudinal axis of said combustion chamber, and means for selectively igniting one or more of the shaped charges in each grain segment whereby as one grain segment burns out, the inert partition separating the grain segments prevents the next adjacent grain segment from igniting, thereby shutting down the rocket, whereby the propellant grain can be re-ignited when desired by igniting one or more of the shaped charges in the next adjacent segment, and where the thrust provided by each grain segment can be controlled by varying the number of shaped charge ignitions.

8. A restartable thrust modulated solid propellant rocket having a combustion-chamber and a nozzle comprising a propellant grain, said propellant grain having a burning surface with regressive burning characteristics, the relationship between the burning surface area and the throat area of the nozzle being selected so at least after an interval of time after the propellant grain has been ignited, the ratio between the burning surface area and the throat area is below a critical value required for sustained combustion, a plurality of groups of shaped charges embedded in the propellant grain at selected distances from the initial burning surface, each of said shaped charges being directed toward the initial burning surface of said propellant grain, the number of shaped charges in each group of shaped charges increasing with the distance of the group from the initial burning surface so that as the size of the burning surface decreases due to the combustion of the propellant grain, greater numbers of shaped charges can be ignited to maintain the area of the burning surface at a sufficiently high value for sustaining combustion of the grain, so that by igniting a varying number of shaped charges above the minimum required to maintain combustion, the thrust of the solid propellant grain may be increased or decreased as desired and by stopping the ignition of shaped charges, combustion of the propellant grain will stop.

9. An underwater solid propellant rocket comprising a housing, said housing having a nozzle, a propellant grain mounted in said housing, said propellant grain having a surface adapted to be ignited, at least one group of shaped charges embedded in said propellant grain, each of said shaped charges being directed toward said nozzle, means for igniting a predetermined number of said shaped charges to form at least one burning recess in said surface, and the said propellant grain having a burning configuration such that as said burning recess widens, the increase in the burning surface area is sufficient to maintain a high enough pressure in the region adjacent the recess to gradually force the water away from the surface adapted to be ignited, until, when the entire surface of the propellant grain is burning, the generated gas pressure forces the water out of the nozzle and the reaction of the exhaust gases provide thrust.

10. An underwater solid propellant restartable thrust modulated rocket motor comprising a housing, said housing having a nozzle, a solid propellant grain mounted in said housing having a burning surface adapted to be ignited, a plurality of shaped charges embedded in said propellant grain and at selected distances from said burning surface each of said shaped charges being directed toward said nozzle, means for igniting a predetermined number of shaped charges to form at least one burning recess in said surface, said propellant grain having a configuration such that even when the entire burning surface of the propellant grain has been ignited, the resulting pressure will be insufficient to keep out the water, and means for sequentially firing the remaining shaped charges in the propellant grain in a pattern sufficient to continuously form recesses in the burning surface and thereby increase the area of the burning surface and maintain the internal pressure in the housing of the motor at a point above the pressure of the water whereby water is kept out of the housing and the reaction of the gases leaving the nozzle provides thrust, so that by stopping the firings of shaped charges, the internal pressure in the housing will decrease, whereupon water enters the housing and extinguishes combustion until other shaped charges are fired to restart the motor.

11. An underwater solid propellant restartable thrust modulated rocket motor comprising a housing, said housing having a nozzle, a solid propellant end burning grain mounted in said housing, a plurality of groups of shaped charges mounted in the housing, each of said shaped charges being directed toward said nozzle, said groups being in axially spaced relation to each other, means for igniting the shaped charges in the group nearest the end of the grain, the number of shaped charges ignited and the depth of the recesses formed being selected so the ratio of the burning surface area to the cross-sectional area of the resulting recesses produces a gas pressure at the point of origin of the recesses higher than the water pressure at the terminal part of the recesses at that particular depth, the area of the burning surface of the propellant grain being such that even when the entire end of the grain has been ignited the resulting pressure will be insufficient to keep water out of the housing, and means for continuously and sequentially firing the shaped charges in the adjacent groups of shaped charges to form recesses in the burning end of the propellant grain as needed, in order to keep the area of the burning surface large enough so that the internal pressure in the housing is higher than the pressure of the water whereby water is forced out of the housing and the reaction of the gases leaving the housing provides thrust, and by stopping the firings of the shaped charges, the internal pressure in the housing will decrease, whereupon water enters the housing and extinguishes combustion until the shaped charges in another group are fired to restart the motor.

12. An underwater solid propellant rocket motor comprising a housing, said housing having a nozzle, a tubular solid propellant grain mounted in the housing, linear shaped charges embedded in the propellant grain parallel to the axis of the grain, each of said shaped charges being directed radially toward the longitudinal axis of said housing, said shaped charges being disposed in angularly spaced relation to each other around the axis of the grain and positioned so when they are ignited, they form respective grooves in the grain communicating with the inner surface of the tubular solid propellant grain bounding the bore therethrough, and the number of shaped charges fired being sufficient so that the combustion in the grooves produces a gas pressure sufficient to keep water out of the bore, said propellant grain being designed so as burning continues, the size of the bore increases in proportion to the increase in area of the burning inner surface whereby the increased area of the burning inner surface causes a gas pressure to be maintained in the bore above the pressure of the water, so that water is prevented from entering the bore and sustained combustion is possible.

13. A solid propellant rocket having a nozzle and throat comprising in combination a housing, a propellant grain mounted in said housing, said propellant grain having recesses formed therein, said recesses being filled with an inert material, and at least one shaped charge included in each recess and being directed toward the throat of said rocket so when the shaped charges are fired, the respective jets therefrom force the inert material out of the recesses and ignite the walls of the recesses to provide an increased burning area and a resulting increase in thrust.

14. A solid propellant rocket including a combustion chamber and nozzle comprising in combination a propellant grain having a surface adapted to be ignited, and shaped charge means embedded in said propellant grain and directed toward said nozzle so that when said shaped charge means is fired, the impact of the jet from the shaped charge means on the propellant grain ignites said surface of the propellant grain and forms a recess therein communicating with the surface, thereby increasing the area of the surface to provide increased thrust.

15. A solid propellant rocket comprising in combination a housing, a propellant grain mounted in said housing, said propellant grain having a surface adapted to be ignited, a plurality of shaped charge means mounted in said propellant grain at selected distances from said surface, and means for selectively firing said shaped charge means, said shaped charge means being directed toward said surface so that when the surface of the propellant again is ignited and burns to within a predetermined distance of said shaped charge means, the shaped charge means can be fired selectively to create recesses in said propellant grain communicating with the burning surface whereby the area of the burning surface is increased to provide increased thrust.

16. A solid propellant rocket motor comprising a propellant grain with a burning pattern configuration which produces grain slivers in the circumferential portion of the burning grain, and shaped charge means positioned in each circumferential portion of the propellant grain which forms a grain sliver such that when the shaped charge means are ignited, they increase the burning area in each sliver to a level sufficient to mainain combustion whereby the slivers are completely burned and the thrust of the rocket motor produced by the burning slivers is maintained at a desired level until burnout.

17. A solid propellant rocket motor comprising a tubular propellant grain having an inner bore surface adapted to be ignited, a plurality of shaped charges embedded in the propellant grain and directed radially toward the longitudinal axis of said grain, at least some of the shaped charges being in angularly spaced relationship to each other around the axis of the grain to form a standard grain shaped charge configuration wherein at least some of said shaped charges are in uniformly angularly spaced relationship to each other, and means for igniting said shaped charges to form uniformly angularly spaced radially extending elongated recesses in the grain communicating with the inner bore surface thereof to thereby form a propellant grain with a star-shaped burning pattern.

18. A solid propellant rocket motor comprising a tubular propellant grain having an inner bore surface adapted to be ignited, a plurality of shaped charges embedded in the propellant grain and directed radially toward the longitudinal axis of said grain, at least some of said shaped charges being in angularly spaced relationship to each other around the axis of the grain to form a standard grain shaped charge configuration, and means for igniting one of the shaped charges to form an elongated radially extending recess in the grain communicating with the inner bore surface thereof to form a propellant grain with a key-shaped burning pattern.

19. A restartable thrust modulated solid propellant rocket motor having a combustion chamber, nozzle and throat comprising an axially extending solid propellant grain, the transverse cross-section of said grain having a generally constant area, said grain having an end burning surface area to provide a generally constant thrust, the ratio of the burning surface area with respect to the size of the throat of the nozzle being such as under conditions of low combustion chamber pressure, the propellant grain will not burn, the dimensions of the burning surface area and the size of the throat being selected so they are just below the critical dimensions required for sustained combustion of the propellant grain, a plurality of shaped charges embedded in the propellant grain at selected distances from the end burning surface, each of said shaped charges being directed toward said throat so that by igniting the shaped charges in sequence starting with the shaped charges nearest the end burning surface, recesses can be sequentially formed in the burning surface at a rate sufficient to increase and maintain the area of the burning surface at a level above that required for sustained combustion of the propellant grain, and by stopping the firing of shaped charges, combustion of the propellant grain stops and the rocket motor is shut down until the required number of shaped charges are again fired to restart the motor with a thrust related to the number of shaped charges that have been fired.

References Cited by the Examiner

UNITED STATES PATENTS

| | | | |
|---|---|---|---|
| 2,956,401 | 10/1960 | Kane | 60—35.6 |
| 2,959,001 | 11/1960 | Porter | 60—35.6 |
| 3,105,350 | 10/1963 | Eichenberger | 60—35.3 |
| 3,107,620 | 10/1963 | O'Donnell | 60—35.6 X |
| 3,128,600 | 4/1964 | Oldham | 60—35.6 |
| 3,136,120 | 6/1964 | Grosh | 60—35.6 |
| 3,143,853 | 8/1964 | Sobey | 60—35.6 |

FOREIGN PATENTS 505,747   5/1939   Great Britain.

MARK NEWMAN, *Primary Examiner.*

SAMUEL FEINBERG, SAMUEL LEVINE, *Examiners.*

C. R. CROYLE, *Assistant Examiner.*